United States Patent Office 3,557,525
Patented Jan. 26, 1971

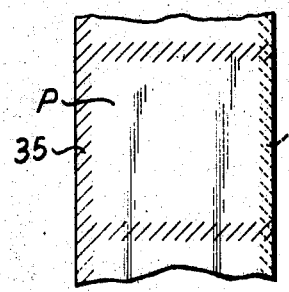
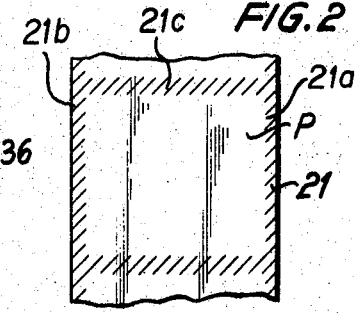
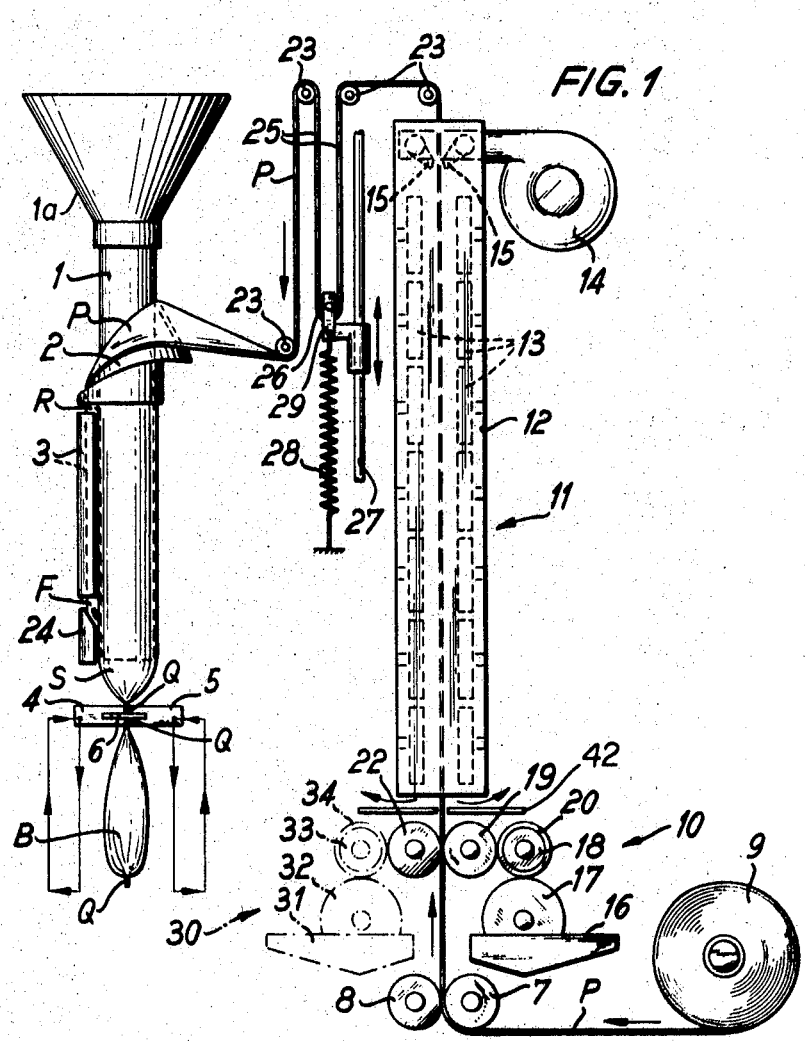

3,557,525
APPARATUS FOR MAKING AND FILLING BAGS
Ulrich Bauder, Stuttgart, Germany, assignor to Fr. Hesser Maschinenfabrik, A.G., Stuttgart, Germany, a corporation
Filed Jan. 18, 1968, Ser. No. 698,775
Int. Cl. B65b 9/00, 61/00
U.S. Cl. 53—180                    3 Claims

ABSTRACT OF THE DISCLOSURE

Apparatus for forming, filling and sealing bags formed from a continuous web of paper or carbon-like material which is coated with longitudinal and transverse adhesive regions, dried, placed over a forming tube to create a web of endless tubing. Seal jaws press the longitudinal and intermittent transverse adhesive regions to establish seams. The tubular web is filled, closed by seal jaws and cut into individual bags.

---

The invention relates generally to an apparatus for making bags from an endless web of packaging material composed of paper or similar non-heat seal responsive materials and for filling the bags.

In the prior art devices are already known for producing bags by passing an endless web of packaging material over tubular forming tools which join the longitudinal margins thereof to form a closed tube. Thereafter a continuous series of containers are formed by applying heat transversely to the tube to establish a transverse closing seam at certain intervals and by severing the resulting bag from the webbing. The construction of the conventional machinery requires that the webbing material consist of or be impregnated with a thermoplastic material to facilitate the heat sealing of the margins. An apparatus of this type is shown in U.S. Pat. 2,200,971.

Under certain conditions however, it is undesirable to utilize thermoplastic packaging material or the like. For example it is frequently economically more advantageous to utilize paper or light carton as material for making the bag. Heretofore it has not been possible to produce bags in the manner described above, as the conventional equipment cannot be adapted to handle material other than thermoplastic.

It is therefore the primary object of this invention to provide an apparatus of the type described above for making and filling bags of non-heat seal responsive webbing material.

It is another object of this invention to provide an apparatus of the type described above in which paper, light carton or like material can be utilized in order to reduce the cost factors normal to devices and material used in the prior art.

It is another object of this invention to provide an apparatus having a tube forming mechanism and means for depositing under suitable conditions adhesive materials and utilizing these deposits for making a longitudinal and transverse seam to make a bag.

An aspect of the present invention resides in the provision of an apparatus for forming, filling and sealing bags. The apparatus or system conventionally includes a forming tube, a web of packaging material drawn over the tube and seal jaws arranged proximate to the tube for closing the longitudinal margins and at spaced intervals transverse regions of the tubular web. The latter is then cut along the transverse closing seam. The improvement includes an arrangement for depositing adhesive materials responsive to pressure or heat upon regions of the web forming the longitudinal margins and the transverse closing seam, the arrangement being stationed to apply the adhesive material before the dried web is drawn over the forming tube.

For a better understanding of the present invention, together with other and further objects thereof, reference is had to the following description taken in connection with the accompanying drawings, and its scope will be pointed out in the appended claims.

In the drawings:

FIG. 1 is a schematic illustration of the bag making and filling apparatus in accordance with this invention;

FIG. 2 is a fragmentary top view of a web of packaging material which has been provided with an adhesive deposit by the apparatus in accordance with FIG. 1; and FIG. 3 is a view similar to FIG. 2 illustrating a modification of the location of the adhesive region for sealing bags.

Referring now to FIG. 1, there is shown an apparatus for making bags comprising a hollow forming tube 1 having integrally at the upper end a funnel-like opening 1a to receive the products, or fill goods (not shown), with which the bags are to be filled. The forming tube 1 is coaxially surrounded in spaced relation, intermediate to its ends by a tube forming shoulder 2 and slightly below the shoulder 2 there is positioned in parallel and in close proximity to the forming tube 1 a pair of elongated seal jaws 3, for joining the longitudinal margins of a web of packaging material P which is placed around the forming tube 1 as hereinafter further described. Spaced relative to the forming tube 1 adjacent to the lower end thereof are a pair of transverse or cross seal jaws 4 and 5 which movably extend lengthwise and transverse to the tube 1. A separating knife 6 projects into and between the jaws 4 and 5 and is disposed (by means not shown) for perpendicular movement relative to the longitudinal axis of the forming tube 1.

An endless web of packaging material P of paper, light carton or similar material which is not heat-seal responsive, is withdrawn from a supply roll 9 by means of a pair of pull rolls 7 and 8 which guide the sheet-like web toward an adhesive depositing station 10. The station 10 comprises a supply container 16 suitably filled with a paste or liquid type adhesive material and a scoop roll 17 rotatably suspended into the container 16 and in rolling contact with form roll 18 for transferring the adhesive. The roll 18 has on its circumference a concentric transfer surface 20 which in turn in in rolling, adhesive transfer contact with application roll 19. The surface 20 has a configuration complementary to the geometry of the desired adhesive region 21 on the web P which, in the preferred embodiment, is similar to a ladder as shown in FIG. 2. In other words, the longitudinal margins 21a and 21b are adhesive regions which, at predetermined increments, are connected by a cross or transverse adhesive regions 21c. A roll 22 arranged facing the transfer roll 19 on the opposite side of the web P facilitates the proper positioning of the webbing P during the step of depositing the adhesive material.

After the webbing has thus been provided with adhesive regions, the web P is guided into and through the drying apparatus 11 in which the adhesive material is dried. The drying station or apparatus 11 includes a heating tunnel 12 in which a plurality of radiant heaters 13 are arranged in two rows parallel to the longitudinal axis of the tunnel 12 and one row of the heaters faces the front and the other the back side of the web P as the latter moves through the tunnel. Close to the exit of the tunnel an externally mounted blower 14 supplies a pair of jets 15 located inside the tunnel with air which is discharged on each side of and against the web P. The air is circulated through the tunnel and discharged at the bottom thereof with a pair of air deflectors 42 preventing any undue interference with the adhesive depositing operation.

After the web leaves the tunnel 12 a plurality of stationary idler or guide rolls 23 cause the dried web P to be looped towards the form shoulder 2 which places the web P in tubular form around the forming tube 1, in a manner conventional in the art, so that the side margins containing the adhesive contact surfaces 21a, 21b of the web project substantially radial from the periphery of the forming tube 1 in co-extending relationship. The pair of relatively movable seal jaws 3, of which only one is shown in FIG. 1, cause the margins 21a and 21b to be pressed face to face into adhesive contact to form a tight, continuous, longitudinally extending fin seal seam F whereby the endless packaging web P becomes an endless tube S. The transverse seal jaws 4, 5, sequentially seize the bottom portion of the endless tube S and pressure (and/or heat) is applied to substantially centerfold the tubular adhesive region 21c into sealing contact to establish the transverse seam Q.

The resulting closed tube S is then filled with fill products through funnel 1a and sequentially withdrawn from the forming tube by conventional means not shown. For further reference see, for example, U.S. Pat. 3,350,840 assigned to the same assignee as the present invention. The transverse seal jaws 4 and 5, are then again actuated and the resulting bag B is sealed at the upper end located above the fill good in the manner as described above relative to the bottom seam and is then cut from the tube S transversely, along the centerline of region 21c, by means of the separating knife 6, so that an individual, sealed bag B is created from the tubular web.

A switch 24 can be arranged below the seal jaw 3 to flatten the fin seal seam F against the tubular web S in case difficulties are encountered during the actuation of seal jaws 4 and 5.

Inasmuch as the pull rolls 7, 8 and the station 10 for depositing the adhesive material are preferably driven at the same speed, while the withdrawal of the tube occurs stepwise, it is desirable to interpose between the forming tube 1 and the drying station 11 an adjusting loop which is established by an adjusting roller 26 mounted on a spring 28 biased support 29 and bearing upon the web. The U-shaped loop is supported at its upper ends by guide rollers 23. A vertically arranged guide rail 27 slidably receives one end of the support 29 to permit the suport to move up and down for compensating purposes.

In accordance with this invention it is also possible to circumferentially overlap the longitudinal adhesive regions to establish an overlapping seam. In that case, a station 30 for depositing the adhesive material is provided opposite to station 10 on the other side of the web P. The station 30 is similar in construction to station 10 and comprises an adhesive supply container 31, a scoop roll 32 suspended in the container and a form roll 33 in rolling contact with the scoop roll and transfer roll 22. To create the overlapping seam and the required adhesive regions, one form roll, e.g., roll 18, has a surface configuration 20 complementary to region 35 of FIG. 3, and the other form roll, i.e. 33, has a surface complementary to adhesive deposit region 36, see FIG. 3, which is shown dashed as being on the back side of the web P. The overlapping type seam requires only one movable seal jaw 3.

The formation of the tube S need not, as shown in FIG. 1, occur in a purely vertical direction, but may, depending upon the type of goods involved, and the conveyor equipment required, take place in an inclined or horizontal position in which case the hollow forming tube 1 does not have to be completely enclosed circumferentially.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In an apparatus for forming, filling and sealing bags, a forming tube, means associated with said tube for advancing and drawing a web of packaging material over said tube means proximate to the tube for closing the longitudinal margins of the tubular web and for closing the tubular web transversely to its axis at predetermined increments, means for sequentially cutting the web along the transverse closing seam to form individual bags, the improvement comprising: means for depositing adhesive material responsive to pressure or heat upon regions of said web constituting said longitudinal margins and said transverse closing seams, said last mentioned means being stationed to apply said adhesive material before said web is drawn over said forming tube; drying means comprising a tunnel having radiant heaters located therein and spaced along the path of travel of the web, said tunnel being interposed between the station having means for depositing adhesive materials and the station constituting said forming tube, and wherein said heaters are disposed in two rows, each parallel to said tunnel and each facing one side of said web while the web passes through the tunnel.

2. In an apparatus for forming, filling and sealing bags, a forming tube, means associated with said tube for advancing and drawing a web of packaging material over said tube, means proximate to the tube for closing the longitudinal margins of the tubular web and for closing the tubular web transversely to its axis at predetermined increments, means for sequentially cutting the web along the transverse closing seam to form individual bags, the improvement comprising: means for depositing adhesive material responsive to pressure or heat upon regions of said web constituting said longitudinal margins and said transverse closing seam, said last mentioned means being stationed to apply said adhesive material before said web is drawn over said forming tube; drying means comprising a tunnel having radiant heaters located therein and spaced along the path of travel of the web, said tunnel being interposed between the station having means for depositing adhesive materials and the station constituting said forming tube; and a blower associated with said tunnel supplying air into the tunnel through at least two jets, one jet discharging the air against one side of the web and another jet discharging the air against the other side.

3. In an apparatus according to claim 2, wherein said heaters are disposed in two rows, each parallel to said tunnel and each facing one side of said web while the web passes through the tunnel.

References Cited

UNITED STATES PATENTS

| 2,272,530 | 2/1942 | Patterson | 53—28 |
| 2,390,071 | 12/1945 | Barnett | 53—28 |
| 3,189,702 | 6/1965 | Wall et al. | 53—28X |

THERON E. CONDON, Primary Examiner

E. F. DESMOND, Assistant Examiner

U.S. Cl. X.R.

93—33